United States Patent [19]

Perry et al.

[11] 4,181,828

[45] Jan. 1, 1980

[54] SAFETY CUT-OUT DEVICES

[75] Inventors: Dennis A. Perry; Roger H. Creasey, both of Sheffield, England

[73] Assignee: Hayden Nilos Conflow Limited, Sheffield, England

[21] Appl. No.: 747,178

[22] Filed: Dec. 3, 1976

[30] Foreign Application Priority Data

Dec. 6, 1975 [GB] United Kingdom ............... 50155/75

[51] Int. Cl.$^2$ .............................................. H01H 3/00
[52] U.S. Cl. ................................... 200/18; 200/153 L
[58] Field of Search .......... 200/6 A, 17 R, 18, 153 T, 200/153 L, 153 LA, 330, 337, 50 C

[56] References Cited

U.S. PATENT DOCUMENTS

| | | | |
|---|---|---|---|
| 3,308,675 | 3/1967 | Jonsson | 200/6 A X |
| 3,666,900 | 5/1972 | Rothweiler et al. | 200/6 A |
| 3,818,154 | 6/1974 | Presentey | 200/6 A |
| 3,827,313 | 8/1974 | Kiessling | 200/6 A X |
| 3,828,148 | 8/1974 | Roeser | 200/6 A |
| 3,872,601 | 3/1975 | Burgin | 200/18 X |

*Primary Examiner*—James R. Scott
*Attorney, Agent, or Firm*—Lowe, King, Price & Becker

[57] ABSTRACT

A cut-out device, particularly applicable to mining machines, especially gate end machines where the close proximity to personnel in confined spaces gives rise to risk of injury of a very serious nature and even death, comprises a housing associated with a switch or valve and a plunger mounted in the housing in such a manner that movement in any direction of a push-rod projecting from the housing results in movement of the plunger to operate the switch or valve to stop operation of the machine, and two such cut-out devices spaced along one side of a machine may have a trip bar connecting their push-rods so as to widen the extent of protection.

9 Claims, 6 Drawing Figures

SAFETY CUT-OUT DEVICES

BACKGROUND OF THE INVENTION

This invention relates to safety cut-out devices and is particularly—but not exclusively—applicable to mining machines, especially gate end machines where the close proximity to personnel in confined spaces gives rise to risk of injury of a very serious nature and even death.

The principal object of the invention is to provide a safety cut-out device adapted to operate as the result of contact in any direction of relative movement. A secondary object is to incorporate such a safety cut-out device on a mining machine, especially a gate end mining machine.

SUMMARY OF THE INVENTION

According to the present invention, a safety cut-device comprises a housing, an opening with a part-spherical seat facing inwardly of the housing, an abutment within the housing and generally parallel to the part-spherical seat, a bore through the abutment coaxial with the part-spherical seat, a plunger slidable in the bore in the abutment and having a flange within the space between the abutment and the part-spherical seat, and other end of the plunger being adapted to operate a switch or valve when the plunger moves axially, a push-rod protruding through the opening from a part-spherical end mating with the part-spherical seat and having a flat surface normally contacting a flat surface on the adjacent end of the plunger, and a coil compression spring encircling the plunger between the abutment and the flange so as to urge the plunger against the part-spherical end of the push-rod and the latter against the part-spherical seat.

While an axial push on the push-rod will very evidently result in pushing of the plunger against the spring to operate a switch or valve with which the plunger is adapted to cooperate, any lateral movement of the protruding push-rod in any direction will be permitted by the part-spherical seat and mating end of the push-rod, thus causing rocking of the flat surface of the part-spherical end relative to the flat surface on the plunger, with, again, a resultant pushing of the plunger against the spring to operate the switch or valve.

With the safety cut-out device described above incorporated on a movable machine and the switch or valve adapted to stop the machine upon pushing of the plunger, any substantial contact of an operator with the push-rod will rapidly result in stopping of the machine.

A machine on which the device is incorporated may be a mining machine, such as a gate end machine, or any machine operating in a confined space in which it could trap and crush personnel.

In particular application of the device to a gate end mining machine and any other movable machine having a side extent capable of trapping personnel anywhere along a substantial length it is desired to provide safety means to prevent injury. The machine is preferably provided with two safety cut-out devices in accordance with the invention and the push-rods are preferably connected by a trip bar, so that any substantial contact of an operator with any part of the trip bar will result in operation of one or both of the safety cut-out devices.

The trip bar is preferably connected to heads on the push-rods, and coil compression springs are preferably provided between the heads and the housings to ensure that the push-rods return to positions coaxial with their respective plungers after any disturbing force on the trip bar has been removed. The trip bar may be connected to the heads by arms, thus affording a leverage to the action of the trip bar on the push-rods. A flexible sleeve or bellows is preferably connected between each head and the respective housing to prevent the ingress of dirt and debris.

BRIEF DESCRIPTION OF THE DRAWINGS

Embodiments of the invention will now be described, by way of example only, with reference to the accompanying drawings, in which

FIGS. 1(a) and 1(b) illustrate the configuration of the safety cut-out device of FIG. 1 in different stages of operation;

DESCRIPTION OF THE PREFERRED EMBODIMENTS

Figure 1:
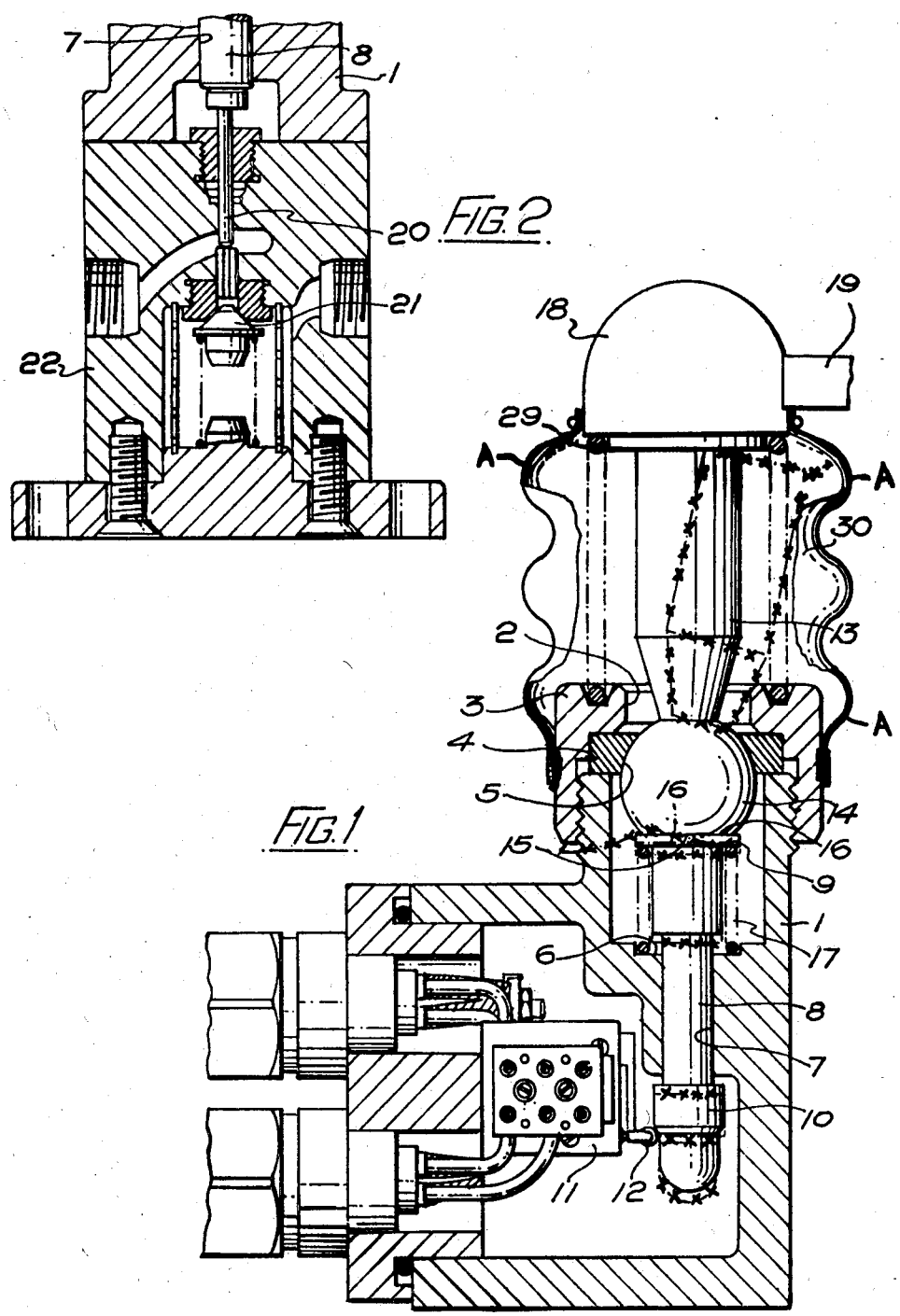
FIG. 1 is a section through a safety cut-out device in accordance with the invention adapted to operate a switch.

The safety cut-out device shown in FIG. 1 comprises a housing 1 having an upper, externally threaded portion for receiving a cap nut 3. The cap nut includes an opening 2 and secures a ring 4 with a part-spherical seat 5 facing inwardly of the housing. An abutment 6 is located within the housing and extends generally parallel to the seat 5. A bore 7 extends through the abutment coaxial with the seat 5. A plunger 8 is slidable in the bore 7 in the abutment 6 and has a flange 9 within the space between the abutment and the seat. The other end of the plunger is provided with a knob 10 to operate a switch 11 through a contact roller 12 when the plunger moves axially. A push-rod 13 protrudes through the opening 2 from a part-spherical end 14 mating with the seat 5 and having a flat surface 15 normally contacting a flat surface 16 on the adjacent end of the plunger 8. The push rod 13 is generally cylindrical and includes a tapered, frusto-conical portion projecting upwardly from its part-spherical end 14. A coil compression spring 17 encircles the plunger between the abutment 6 and the flange 9 so as to urge the plunger against the part-spherical end of the push-rod and the latter against the part-spherical seat.

Figure 3:
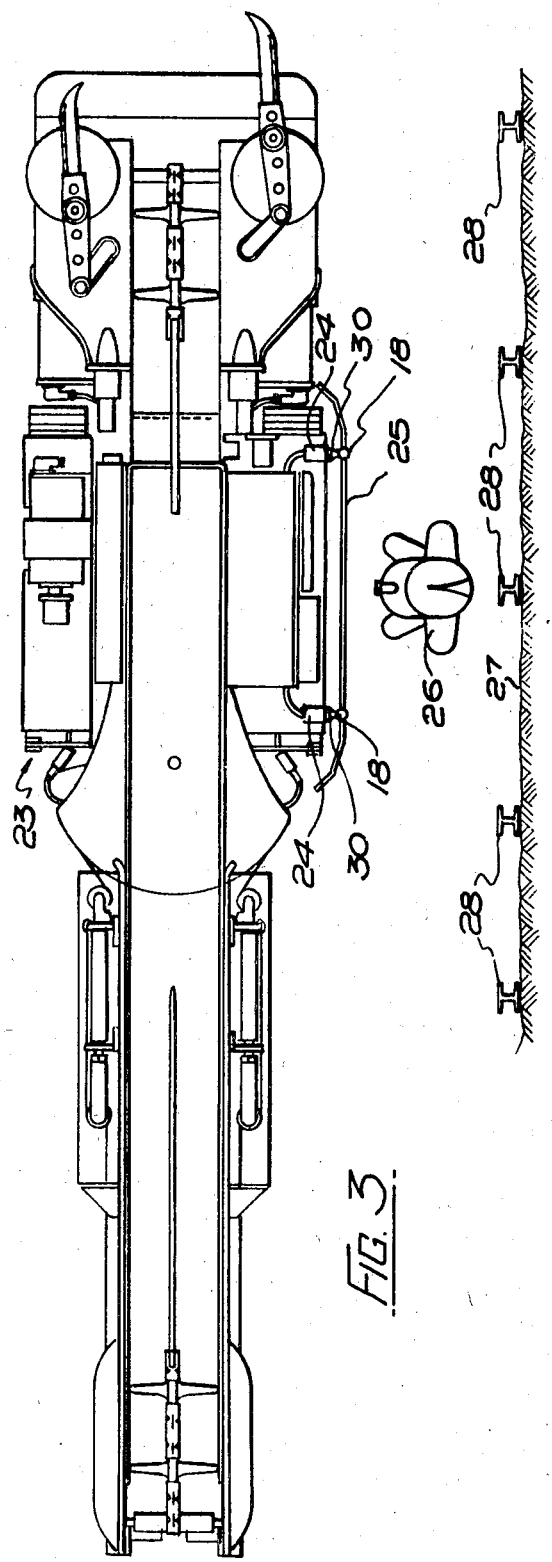
FIG. 3 is a plan of a gate end mining machine incorporating two safety cut-out devices and a trip bar in accordance with the invention.
Figure 4:
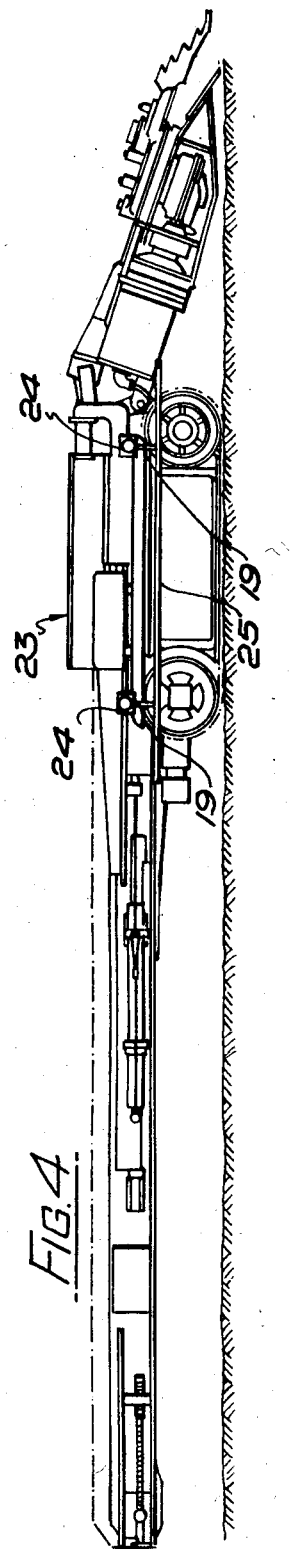
FIG. 4 is an elevation of the machine of FIG. 3.

The push-rod 13 is shown provided with a head 18 and an arm 19 for its particular application to a gate end mining machine (as will be described with reference to FIGS. 3 and 4). However, the safety cut-out device can operate without these parts. For example, an axial push on the push-rod 13, as indicated by arrow Y in FIG. 1(b) will result in pushing of the plunger 8 against the spring 17 to operate the switch 11. In addition, any lateral movement of the protruding push-rod in any direction, e.g., as indicated by arrow X in FIG. 1(a) will be permitted by the part-spherical seat 5 and mating end 14 of the push-rod, thus causing rocking of the flat surface 15 of the part-spherical end 14 relative to the flat surface 16 on the plunger 8 with, again, a resultant pushing of the plunger against the spring 17 to operate the switch 11.

With the safety cut-out device described above incorporated on a machine and the switch 11 adapted to stop the machine upon pushing of the plunger 8, any substantial contact of an operator with the push rod 13 will rapidly result in stopping of the machine.

Figure 2:
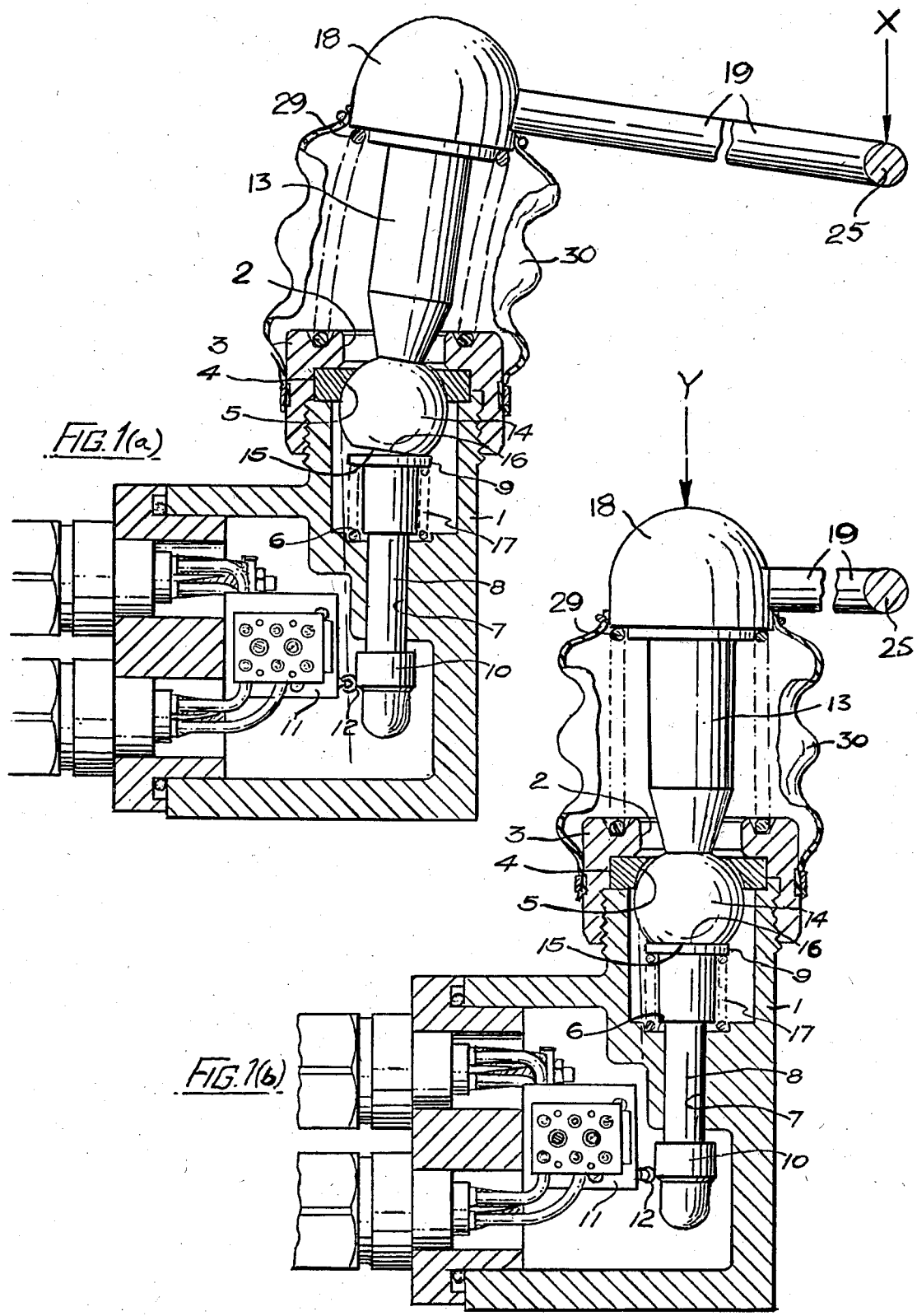
FIG. 2 corresponds to the lower part of FIG. 1 and shows the device adapted to operate a valve.

In FIG. 2 the push rod 8 does not carry a knob 10 but abuts instead a spindle 20 which when pushed by the plunger unseats a valve member 21 of, for example, a pilot valve 22 for effecting closing of a control valve of a hydraulically operated machine.

In the particular application to a gate end mining machine 23 (FIGS. 3 and 4) the machine is provided with two safety cut-out devices 24 in accordance with the invention, with heads 18 on the push-rods 13 and arms 19 connecting the heads to a trip bar 25 extending along the side of the machine where an operator 26 would normally be stationed. A substantial contact of the operator with any part of the trip bar will result in operation of one or both of the safety cut-out devices 24, so the machine 23 will be stopped before it can trap and crush the operator between itself and the mine wall 27 or roof supports 28 spaced along it. The arms 19 afford a leverage to the action of the trip bar 25 on the push-rod 13. Coil compression springs 29 (FIG. 1 only) are provided between the heads 18 and the housings 1 to ensure that the push-rods 13 return to positions coaxial with their respective plungers 8 after any disturbing force on the trip bar 25 has been removed, and a flexible sleeve or bellows 30 is connected between each head and the respective housing to prevent the ingress of dirt and debris.

We claim:

1. A safety cut-out device comprising a housing having an opening formed therein, said housing being provided with a part spherical seat adjacent to the opening and facing inwardly of the housing, an abutment located within the housing and extending generally parallel to the part spherical seat, a bore extending through the abutment coaxial with the part-spherical seat, a plunger slidable in the bore in the abutment and having a flange at one end thereof located within the space between the abutment and the part spherical seat, a control device engageable with the other end of the plunger and operable when the plunger moves axially, a push-rod protruding through the opening and having a part-spherical end mating with the part-spherical seat to allow movement of the push rod in any direction, said part-spherical end having a first flat surface for normally contacting a second flat surface on the adjacent end of the plunger and upon axial movement of the push-rod or rocking of its part-spherical end in the part-spherical seat for sliding the plunger to actuate the control device, and a coil compression spring encircling the plunger between the abutment and the flange to normally urge the plunger against the part-spherical end of the push-rod and the latter against the part spherical seat.

2. The safety cut-out device of claim 1, which includes an enlarged head provided on the push-rod and a coil compression spring located between the head and the housing to normally maintain the push-rod coaxial with the plunger.

3. The safety cut-out device of claim 1, which includes an actuator arm extending transversely from the head.

4. The safety cut-out device of claim 2, which includes a flexible covering connected between the head and housing to prevent the ingress of dirt and debris.

5. In a movable machine having a control switch, a safety cut-out device comprising a housing having an opening formed therein, said housing being provided with a part-spherical seat adjacent to the opening and facing inwardly of the housing, an abutment located within the housing extending generally parallel to the part-spherical seat, a bore extending through the abutment coaxial with the part-spherical seat, a plunger slidable in the bore in the abutment and having a flange at one end thereof located within the space between the abutment and the part-spherical seat, the other end of the plunger being adapted to operate the control switch when the plunger moves axially, a push-rod protruding through the opening and having a part-spherical end mating with the part-spherical seat to allow movement of the push-rod in any direction, said part-spherical end having a first flat surface for normally contacting the second flat surface on the adjacent end of the plunger and upon axial movement of the push-rod or rocking of its part-spherical end in the part-spherical seat for sliding the plunger to actuate the control switch, and a coil compression spring encircling the plunger between the abutment and the flange to normally urge the plunger against the part-spherical end of the push-rod and the latter against the part-spherical seat.

6. The movable machine defined in claim 5, which includes an additional safety cut-out device of the same type, said safety cut-out devices being spaced apart on the machine, and a trip bar connected between the respective push rods of the safety cut-out devices.

7. The movable machine defined in claim 6, wherein each safety cut-out device includes an enlarged head on its push-rod connected to the trip bar and a coil compression spring provided between the head and the housing to insure that the push-rods return to positions coaxial with the respective plungers after any disturbing force on the trip bar has been removed.

8. The movable machine defined in claim 7, each safety cut-out device includes an actuator arm extending from its head and connected to the trip bar.

9. The movable machine defined in claim 7, wherein each safety cut-out device includes a flexible sleeve or bellows connected between its head and housing to prevent the ingress of dirt and debris.

* * * * *